United States Patent
Kunde et al.

(10) Patent No.: US 11,640,542 B2
(45) Date of Patent: May 2, 2023

(54) METHOD AND SYSTEM FOR SYSTEM ARCHITECTURE TECHNOLOGY RECOMMENDATION

(71) Applicant: Tata Consultancy Services Limited, Mumbai (IN)

(72) Inventors: Shruti Kunde, Mumbai (IN); Chetan Phalak, Mumbai (IN); Rekha Singhal, Mumbai (IN); Manoj Nambiar, Mumbai (IN)

(73) Assignee: Tata Consultancy Limited Services, Mumbai (IN)

( * ) Notice: Subject to any disclaimer, the term of this patent is extended or adjusted under 35 U.S.C. 154(b) by 989 days.

(21) Appl. No.: 16/359,951

(22) Filed: Mar. 20, 2019

(65) Prior Publication Data

US 2019/0294977 A1    Sep. 26, 2019

(30) Foreign Application Priority Data

Mar. 21, 2018  (IN) .............................. 201821010329

(51) Int. Cl.
*G06N 5/02* (2006.01)
*G06F 16/9035* (2019.01)
(Continued)

(52) U.S. Cl.
CPC ......... *G06N 5/022* (2013.01); *G06F 16/9035* (2019.01); *G06N 7/005* (2013.01)

(58) Field of Classification Search
CPC ..... G06N 5/022; G06N 7/005; G06F 16/9035
See application file for complete search history.

(56) References Cited

U.S. PATENT DOCUMENTS 9,032,370 B2 *  5/2015  Chakraborty ....... G06F 11/3672
                                                717/124
9,189,203 B1 *  11/2015 Hadar ...................... G06F 8/10
(Continued)

OTHER PUBLICATIONS

Thomas Ford, Interoperability Measurement, Aug. 2008, "https://www.researchgate.net/publication/235208208_Interoperability_Measurement" (Year: 2008).*

(Continued)

*Primary Examiner* — Mark D Featherstone
*Assistant Examiner* — Faezeh Forouharnejad
(74) *Attorney, Agent, or Firm* — Finnegan, Henderson, Farabow, Garrett & Dunner, L.L.P.

(57) ABSTRACT

The disclosure generally relates to system architectures, and, more particularly, to a method and system for system architecture recommendation. In existing scenario, a solution architect often gets minimum details about requirements, hence struggles to design a system architecture that matches the requirements. The method and system disclosed herein are to provide system recommendation in response to requirements provided as input to the system. The system generates an acyclic dependency graph based on parameters and values extracted from an obtained user input. The system then identifies a reference architectures that matches the requirements, and further selects components that match the architecture requirements. The system further selects technologies considering inter-operability of the technologies. Further, the system generates architecture recommendations for the user, based on the selected components, and technologies. The system can collect user feedback for to the recommendation provided, and can generate rankings to improve future recommendations.

9 Claims, 8 Drawing Sheets

(51) Int. Cl.
  *G06N 7/00* (2006.01)
  *G06N 5/022* (2023.01)

(56) References Cited

U.S. PATENT DOCUMENTS

| | | | |
|---|---|---|---|
| 9,721,216 | B2 | 8/2017 | Lane et al. |
| 10,379,850 | B2* | 8/2019 | Bhattacharyya ....... G06Q 10/06 |
| 10,489,845 | B2* | 11/2019 | Mullakkara Azhuvath ................. G06Q 30/0631 |
| 10,558,990 | B2* | 2/2020 | Devarapalli ........ H04L 41/5058 |
| 2007/0288275 | A1 | 12/2007 | Kumar |
| 2014/0279201 | A1 | 9/2014 | Iyoob et al. |

OTHER PUBLICATIONS

Bass, L. et al. (Apr. 1999). "Architecture-Based Development," *Carnegie Mellon Software Engineering Institute*; 49 pages.

Kruchten, P. "An Ontology of Architectural Design Decisions in Software-Intensive Systems," *Proceedings of the $2^{nd}$ Groningen Workshop on Software Variability Management*, Groningen, NL, Dec. 3-4, 2004; 8 pages.

* cited by examiner

METHOD AND SYSTEM FOR SYSTEM ARCHITECTURE TECHNOLOGY RECOMMENDATION

PRIORITY CLAIM

This U.S. patent application claims priority under 35 U.S.C. § 119 to: India Application No. 201821010329, filed on 21 Mar. 2018. The entire contents of the aforementioned application are incorporated herein by reference.

TECHNICAL FIELD

This disclosure relates generally to system architectures, and more particularly to a method and system for system architecture recommendation.

BACKGROUND

Solution architects get certain requirements as their input, and they are expected to design a system that that satisfies the given requirements and provide an intended output. Often, the solution architects are left with minimal information pertaining to various aspects of the requirements.

The inventors here have recognized several technical problems with such conventional systems, as explained below. At present, when it comes to system architecture process, the solution architect involved decides which are the best components and technologies that should go into an architecture. However, there are certain disadvantages with this approach. As the selection of components and technologies may solely rely on expertise, experience and skill level of the solution architect, accordingly the quality of final output (i.e. the architecture) can vary from one person to another. Further, in scenarios in which the solution architect is provided with minimal information, it is very difficult for them to choose right components and technologies that constitute the required system architecture, which again affects the quality of final output.

SUMMARY

Embodiments of the present disclosure present technological improvements as solutions to one or more of the above-mentioned technical problems recognized by the inventors in conventional systems. For example, in one embodiment, an architecture recommendation system is provided. The architecture recommendation system comprises of a hardware processor; and a storage medium comprising a plurality of instructions. The plurality of instructions cause the hardware processor to collect at least one user input with respect to an architecture requirement, via one or more hardware processors, by an Input/Output (I/O) interface of the architecture recommendation system. A recommendation engine of the architecture recommendation system then processes the collected at least one user input, via the one or more hardware processors. By processing the collected at least one user input, the recommendation engine initially generates an acyclic dependency graph based on a plurality of parameters and corresponding values extracted from the user input. The recommendation engine, for each of the plurality of parameters, determines and assigns a weightage. The recommendation engine further identifies at least one reference architecture that matches the architecture requirement specified in the user input. The architecture engine then selects based on the identified at least one reference architecture, a plurality of components to serve the architecture requirement, and further selects a plurality of technologies for the plurality of components, based on inter-operability of the technologies. The recommendation engine then generates at least one architecture recommendation based on the selected components and technologies. The architecture recommendation is then provided to the user, in response to the architecture requirement specified in the user input.

In another aspect, a processor-implemented method for architecture recommendation is provided. In this method, at least one user input with respect to an architecture requirement is collected via one or more hardware processors. The collected user input is then processed, wherein processing of the user input involves a. generating an acyclic dependency graph based on a plurality of parameters and corresponding values extracted from the user input; b. determining and assigning weightage to each of the plurality of parameters; c. identifying at least one reference architecture that matches the architecture requirement specified in the user input; d. selecting a plurality of components to serve the architecture requirement, based on the identified at least one reference architecture; e. selecting a plurality of technologies for the plurality of components, based on inter-operability of the technologies; and f. generating at least one architecture based on the selected components and technologies. The generated architecture recommendation is then provided to the user, in response to the architecture requirement specified in the user input.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
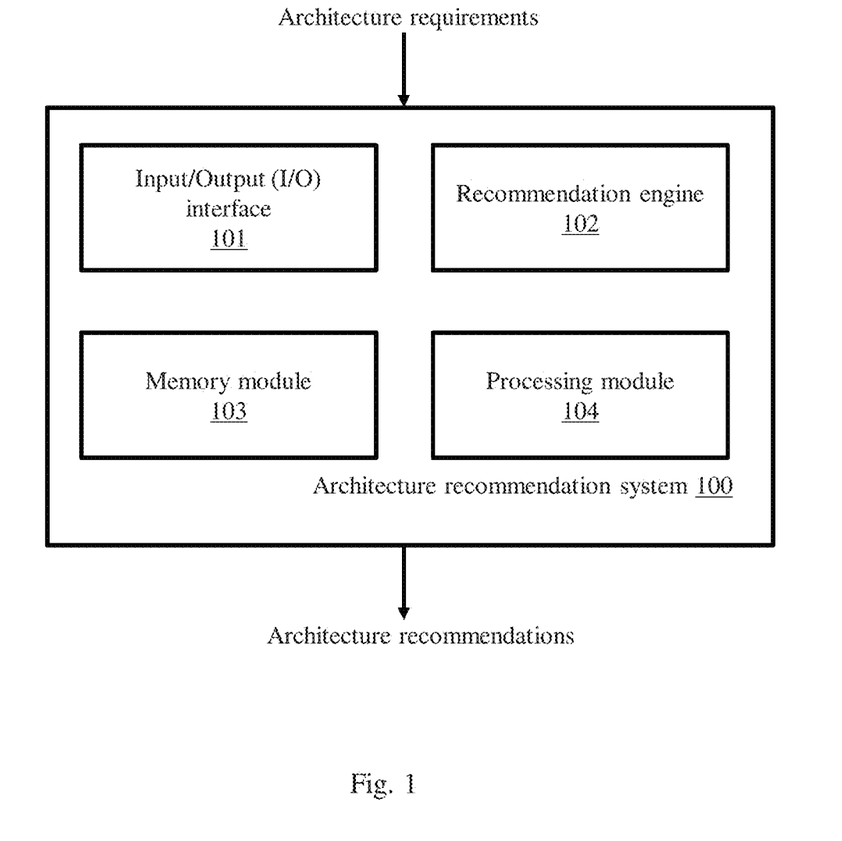
FIG. 1 illustrates an exemplary block diagram depicting an architecture recommendation system, according to some embodiments of the present disclosure.

FIG. 1 illustrates an exemplary block diagram depicting an architecture recommendation system 100, according to some embodiments of the present disclosure. The architecture recommendation system includes an Input/Output (I/O) interface 101, a recommendation engine 102, a memory module 103, and a processing module 104.

The I/O interface 101 is configured to provide suitable interface for any external entity to interact with the architecture recommendation system 100, for performing any action associated with the architecture recommendation process. Here, the term 'external entity' can refer to another system or may even refer to a user who is interacting with the architecture recommendation system 100 to perform any authorized action associated with the architecture recommendation process. The I/O interface 101 may further allow at least one of data access, data exchange, configuration of settings and so on. The I/O interface 101 can be further configured to provide suitable channel with appropriate communication protocol to enable communication with and between other components of the architecture recommendation system 100. For example, the I/O interface 101 can provide an interactive mechanism such as a chatbot which enables user communication with the system 100, and collection of required inputs in a desired manner. For example, the chatbot can ask specific questions to the user so as to obtain intended inputs. The I/O interface 101 collects user inputs at least with reference to architecture requirements, and provides the collected input to the recommendation engine 102. In an embodiment, the user input can be in different formats (such as but not limited to Interactive Graphical user Interface (GUI), text, property file, XML file, and other document formats) i.e. heterogeneous input.

The recommendation engine 102 is configured to collect the architecture requirements as one of the inputs for generating and providing architecture recommendations. The recommendation engine 102 also has access to one or more reference databases (not shown in FIG. 1) that provide data which can be used as reference during different stages of data processing associated with the architecture recommendation process. The recommendation engine 102, as part of pre-processing the obtained heterogeneous inputs, translates the data into a standard format (for example, XML) further processing, using an associated heterogeneous translator, which may be externally or internally connected to the recommendation engine 102. The recommendation engine 102 then extracts parameters/properties from the obtained architecture requirement, and generates a corresponding acyclic dependency graph. Further, weights are assigned which reflect priority of each of the parameters, based on data in a priority metric. The recommendation engine 102 then generates a similarity metric, which represents extent of similarity between architecture requirement specified by the user, and reference architectures available in an associated reference database. The recommendation engine 102 selects at least one architecture having maximum/higher level of similarity with the requirements, from the reference database, as a reference architecture. The similarity metric is calculated as given below:

Similarity Metric for a Parameter S(p):
Ip=Input parameter value set
Cp=Child node parameter
Tp=Set of all child nodes for the parameter
P(Cp)=Priority Level for a node, Cp is based on domain knowledge
Lc=number of left child nodes.
Rc=number of right child nodes.
Sp=Similarity Metric for a Functional Parameter—(1)
Sp=P(Cp)/|Child Nodes|, if Ip=Cp where (Cp∈Tp)
Sp=P(Cp)/|Child Nodes| if Ip≠Cp and P(Cp)≠0
Sp=1/|Child Nodes| if Ip≠Cp and P(Cp)=0
Sp=Similarity Metric for Non Functional Parameter (Latency)—(2)
Sp=1, if Ip=Cp where (Cp ∈ Tp)
Sp=1/Lc+1 if Ip not in Cp.
Sp=Similarity Metric for Non Functional Parameter (Throughput)—(3)
Sp=1, if Ip=Cp where (Cp ∈ Tp)
Sp=1/Rc+1 if Ip not in Cp.

Based on the identified and selected reference architecture(s), the recommendation engine 102 selects components that match the architecture requirements. In the similar manner, the recommendation engine 102 selects technologies that match the components selected. In an embodiment, the recommendation engine 102 checks inter-operability between the technologies being considered, based on an inter-operability metric, and selects only those technologies which are found to be inter-operable. Process of selecting technologies based on inter-operability matrix is explained below:

This inter-operability matrix determines the level of interoperability amongst two technologies. Interoperability can be of multiple types:

Assume the following:
T={t1, t2, t3, . . . , tn} is the set of technologies where n=total number of technologies.
F={f1, f2, f3, . . . , fk} is the feature set where k=total number of features.
C(ti, tj)=Compatibility of 2 technologies ti and tj.

1. Boolean interoperability: Boolean interoperability checks if the two technologies are compatible or not. This means if the two technologies are interoperable then they can be recommended together as a part of a single architecture stack.
   C(t1, t2)=1→t1 and t2 are compatible
   C(t1, t2)=0→t1 and t2 are not compatible
2. Feature interoperability: In this case, the user is interested in determining the interoperability of one or more features of two technologies. A feature level compatibility test is done and based on the number of features that match, the interoperability ratio is determined.

$$\text{Interoperability ratio } (Cr) = \frac{\sum_{l=1}^{k} C(t_i f_l, t_j f_l)}{k} \text{ where } t_i, t_j \in T \tag{4}$$

There may be multiple combinations of technologies. However, extent of compatibility between technologies in each combination/set may be different. In order to identify and select best combination, the recommendation engine 102 calculates weightage for each of the combinations, and a combination having highest weightage value is selected. The recommendation engine 102 may generate a compatibility matrix depicting output of the compatibility check.

The recommendation engine 102 then generates architecture recommendations (also referred to as 'system architecture technology recommendations') based on the selected components, and technologies, and the same are provided to the user. In an embodiment, the recommendation engine 102, while providing more than one architecture recommendations to the user, can rank the recommendations based on extent of similarity with the architecture requirements provided by the user. For example, the architecture that is closest to the architecture requirements (i.e., user requirements) can be ranked one, and the next architecture in terms of similarity can be ranked 2 and so on.

The recommendation engine 102 may further collect, via the I/O interface 101, user feedback in response to the recommendations provided. The user feedback is further used by the recommendation engine 102 to generate feedback based rankings which in turn is used to improve recommendations provided to the user. The feedback based ranking calculation is explained below:

Assume that at any point of time these are the entries in a text file (i.e. user input) in the following format:

TABLE 1

| Template | Technology Set/Code | Current Rank | User Rating |
|---|---|---|---|
| T1 | A | 1 | 4 |
| T2 | B | 2 | 5 |
| T3 | A | 1 | 5 |
| T4 | B | 2 | 4 |
| T2 | B | 1 | 2 |
| T2 | A | 2 | 5 |
| ... | ... | ... | ... | where T1, T2, T3 are names of user input template, {A,B,C} is the code of technology set which corresponds to a recommendation, 1 is current ranking of that particular code and 4 is rating given by user.

The score is calculated as:

Score($i$)=(Σmatching template of corresponding code (weight*rating))*frequency($i$)

(For all i corresponding to each code—a, b, c, d, e)
Weight=(numberOfTechSet+1)−currentRank
Higher the ranking, greater the weight
Rating—feedback rating given by each user Frequency($i$)=number of occurence of code/total occurence of input template (For all i corresponding to each code—a, b, c, d, e)

Based on the score calculated, the recommendation engine 102, for every technology set, recalculates and generates new ranks, and in turn provides new recommendations to the user.

The memory module 103 (also referred to as 'storage medium') can be configured to store all information associated with all stages/processes in the architecture recommendation, in a volatile and/or non-volatile storage space. For example, the memory module 103 stores all the reference databases, all the metrics, a priority table which stores data pertaining to weight/priority assigned to each layer/feature, and so on, and further provides access to the stored data for the recommendation engine 102 and other components of the architecture recommendation system 100. The memory module 103 further allows data access and/or exchange to authorized external entities, with appropriate data modification rights.

The processing module 104 can be configured to provide one or more hardware processors so as to handle all data processing associated with all other components of the architecture recommendation system 100. The processing module 104 is in communication with the other components, collects and executes instructions with respect to data processing pertaining to one or more functions being handled by each of the components. The processing module 104 can be configured to host any type of and any number of hardware processors, which are required to carry out the data processing handled by the architecture recommendation system 100.

Figure 2:
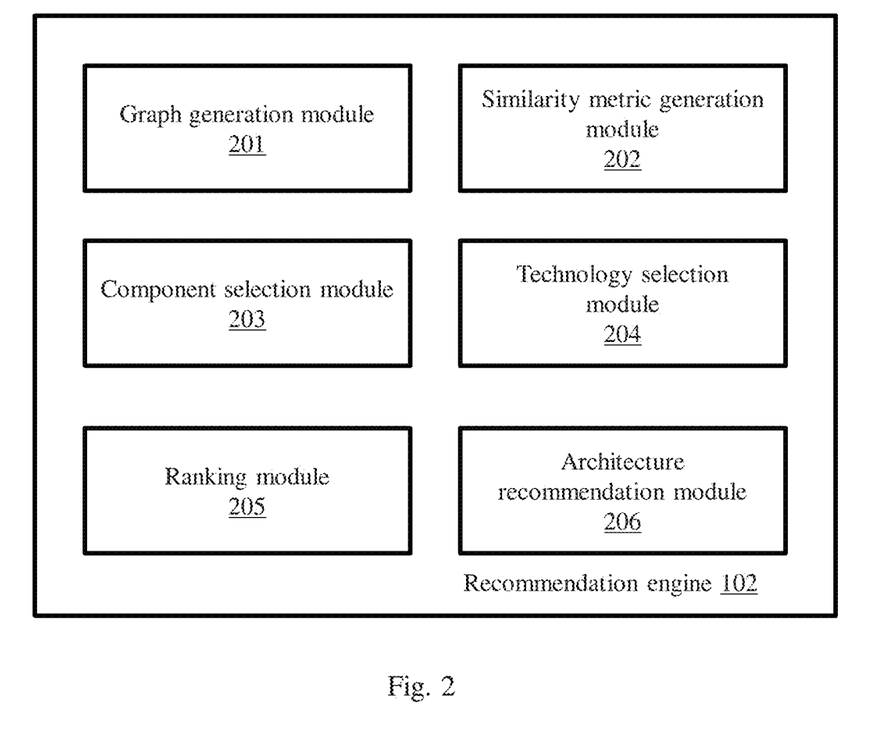
FIG. 2 is a functional block diagram depicting components of recommendation engine of the architecture recommendation system of FIG. 1, according to some embodiments of the present disclosure.

FIG. 2 is a functional block diagram depicting components of recommendation engine 102 of the architecture recommendation system 100 of FIG. 1, according to some embodiments of the present disclosure. The recommendation engine 102 includes a graph generation module 201, a similarity metric generation module 202, a component selection module 203, a technology selection module 204, a ranking module 205, and an architecture recommendation module 206.

The graph generation module 201 is configured to process the user input and extract different parameters and corresponding values from the architecture requirement specified in the user input. The graph generation module 201 further generates an acyclic dependency graph based on the extracted parameters and values, wherein the parameters form the edges of the graph and the values form leaf nodes of the graph. The graph generation module 201 is configured to assign weights to the edges of the graph, based on priorities of the parameters as defined in a priority metric. The priorities are pre-defined, and may be based on expertise of one or more subject matter experts. Further, these values may be changed/re-configured as needed.

The similarity metric generation module 202 is configured to generate a similarity metric that indicates or represents extent of similarity between the architecture requirements specified in the user input and the reference architectures available with a reference database in the memory module 103. Based on extent of similarity with the architecture requirements, one or more reference architectures are selected by the similarity metric generation module 202 so as to compare with the user input. In an embodiment, extent of similarity is represented in the form of a similarity index, in the similarity metric. In another embodiment, similarity index at a component level is generated and stored in the similarity metric, wherein the similarity index of components indicate extent of similarity each component has, with the architecture requirements specified in the user input.

The component selection module 203 is configured to select a plurality of components that can be used to generate an architecture matching the user input, based on the one or more reference architectures selected. In an embodiment, the component selection module 203 considers similarity index generated for the components, and selects the components having higher similarity index values.

The technology selection module 204 identifies all technologies that suit the selected components. In this step, the technology selection module 204 considers one or more features associated with each of the components, and identifies technologies that match the one or more features being considered. The technology selection module 204 further checks, based on data in an inter-operability matrix, interoperability between the identified technologies, and selects technologies that are inter-operable.

The ranking module 205 is configured to generate rankings for providing accurate recommendation. In an embodiment, the ranking module 205 generates rankings for the architecture recommendations being provided to the user, based on parameters/factors such as but not limited to extent of similarity (i.e. similarity index) of the recommendation with the architecture requirement. For example, assume that 3 different architectures are being recommended to the user. The ranking module 205 can generate rankings for the architectures, based on similarity index, which indicates to the user which architecture is closely matching his/her requirements. In another embodiment, the ranking module 205 generates ranking based on user feedback to recommendations made. For example, after providing recommendations to a user, the architecture recommendation system 100 collects user feedback for the provided recommendations, in a specific format. The user feedbacks indicate whether the user is happy with the recommendations or not (i.e., whether the recommendations provided were suiting/matching the user requirements or not). The ranking module 205 generates ranks for the recommendations made, and if the user feedback indicates that the recommendations provided were not as expected, by taking the rankings generated as inputs, the architecture generation module 206 can change (i.e. improve) the recommendations. In an embodiment, the feedback data may be stored with an associated database, and the architecture generation module 206 can be trained using this data so as to improve recommendations.

The architecture recommendation module 206 is configured to generate one or more architecture recommendation, based on the components and technologies selected by the component selection module 203 and the technology selection module 204 respectively. The architecture recommendation module 206 can be configured to generate recommendations in one or more specific formats, as pre-configured or as required in response to a demand from the user. The recommendations are then provided to the user, in response to the architecture requirements specified in the user input. In an embodiment, the architecture recommendation includes recommendation of selected components and technologies, wherein the recommended technologies are inter-operable.

Figure 3A:
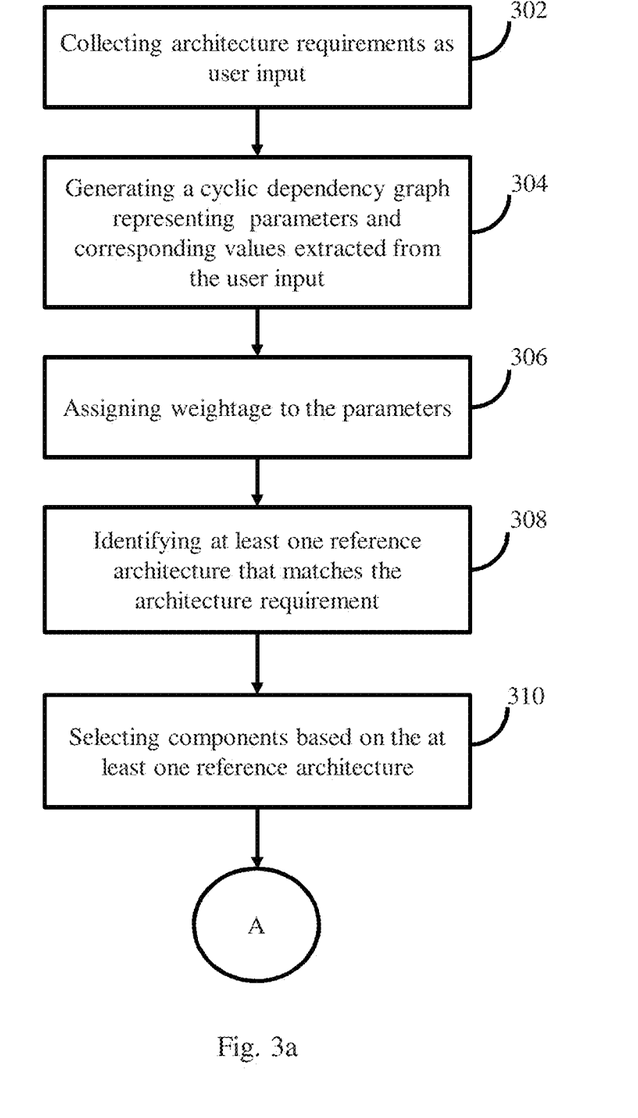
FIGS. 3a and 3b is a flow diagram depicting steps involved in the process of recommending an architecture using the architecture recommendation system, according to some embodiments of the present disclosure.
Figure 3B:
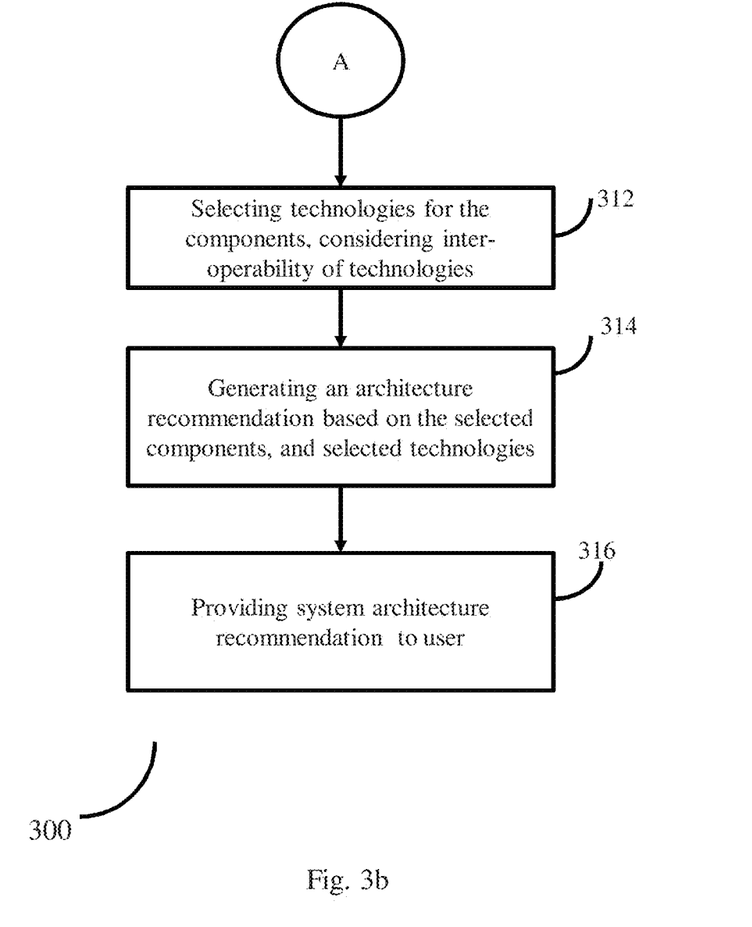
Figure 6A:
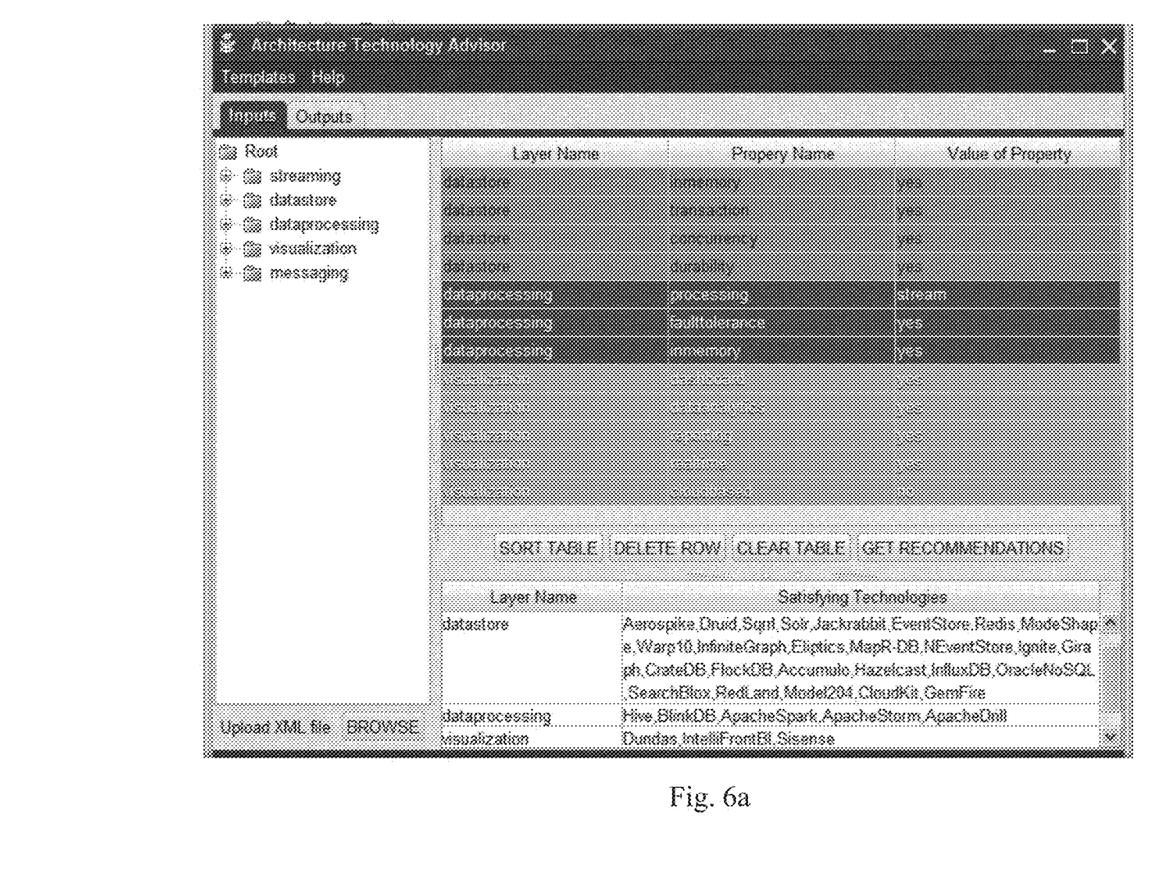
FIGS. 6a and 6b depict examples of input window and corresponding output window of architecture recommendation system, according to some embodiments of the present disclosure.
Figure 6B:
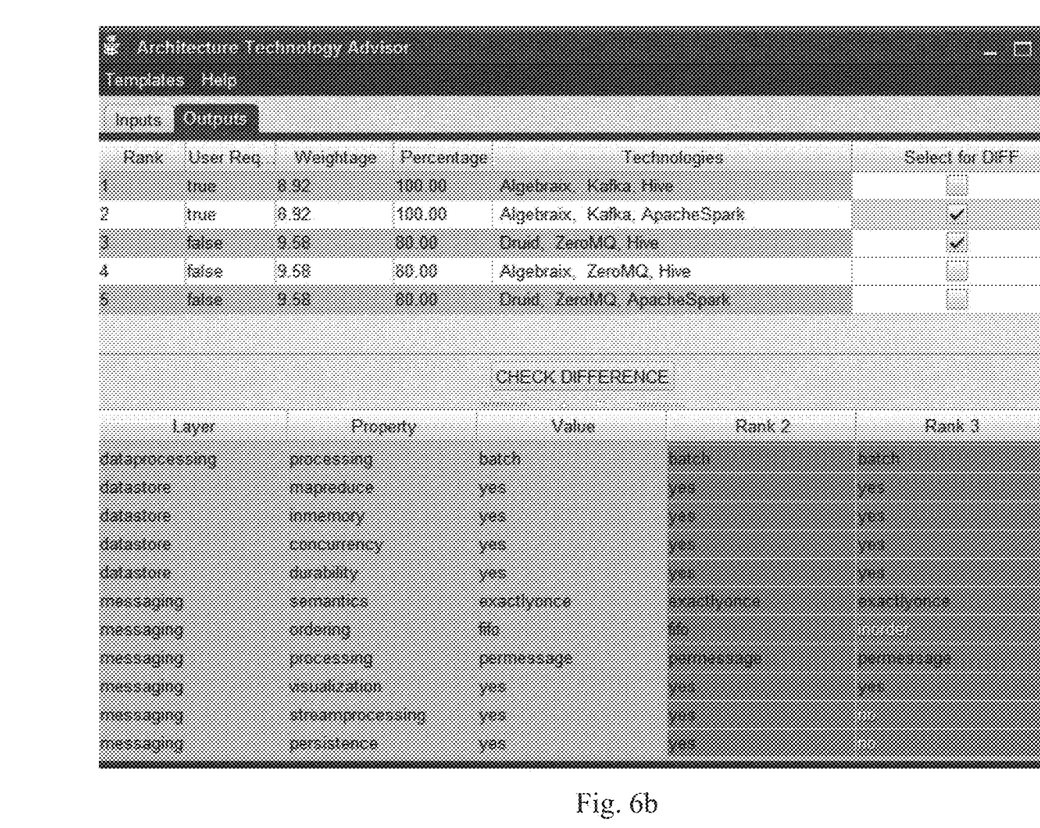

FIG. 3 is a flow diagram depicting steps involved in the process of recommending an architecture using the architecture recommendation system, according to some embodiments of the present disclosure. A user who is seeking recommendations in terms of architecture design, components, technologies and so on, as part of a solution development, can feed all requirements as inputs (302) to the architecture recommendation system 100. An example depicted in FIG. 6a shows different types of inputs provided to the architecture recommendation system 100. With respect to each of different architectural requirements such as datastore, data processing, and visualization, various properties and values are fed as input to the architecture recommendation system 100. The architecture recommendation system 100 extracts various parameters and corresponding values from the requirements fed as input, and generates (304) an acyclic dependency graph based on the extracted parameters and values. Further, weightage of the parameters are determined and are assigned (306). The weightage/priorities are pre-defined, and may be based on expertise of one or more subject matter experts. Further, these values may be changed/re-configured as needed. Further, based on extent of similarity as indicated by a similarity index, one or more reference architectures are identified (308) by the architecture recommendation system 100. Further, based on the one or more reference architectures, the architecture recommendation system 100 selects (310) components that are required to generate an architecture recommendation. Further, for the selected components, the architecture recommendation system 100 selects (312) a plurality of technologies, by taking into consideration, inter-operability of the technologies. The architecture recommendation system 100 then generates (314) one or more system architecture recommendations based on the selected components and the technologies. In an embodiment, the system architecture recommendations include details of the selected components and technologies (as depicted in FIG. 6b). Further, recommendations are provided (316) to the user, based on the generated system architectures.

Figure 4:
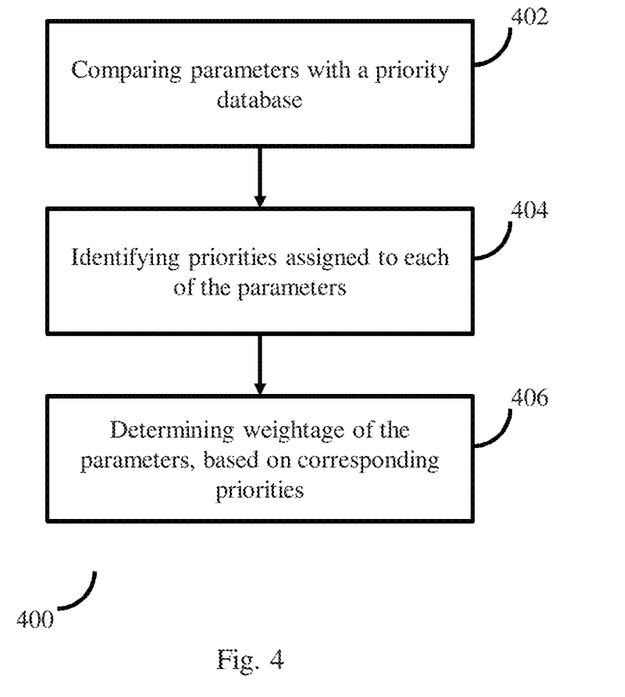
FIG. 4 is a flow diagram depicting steps involved in the process of assigning weightage to parameters extracted from an architecture requirement, by the architecture recommendation system, according to some embodiments of the present disclosure.

FIG. 4 is a flow diagram depicting steps involved in the process of assigning weightage to parameters extracted from an architecture requirement, by the architecture recommendation system, according to some embodiments of the present disclosure. The architecture recommendation system 100 maintains, in an associated storage space in the memory module 103, a priority database that contains information pertaining to priorities assigned to different parameters. The data in the priority database maybe pre-defined and/or may be dynamically configurable. While processing a set of inputs from a user, the architecture recommendation system 100 compares (402) parameters extracted from the user input with the priority database, and identifies (404) priorities (or priority values) assigned to each of the parameters. Further, according to the priorities, weightage is determined and assigned to the parameters. Various actions in FIG. 4 can be performed in the same order or in a different order. Further, or one or more of the actions in method 400 can be omitted.

Figure 5:
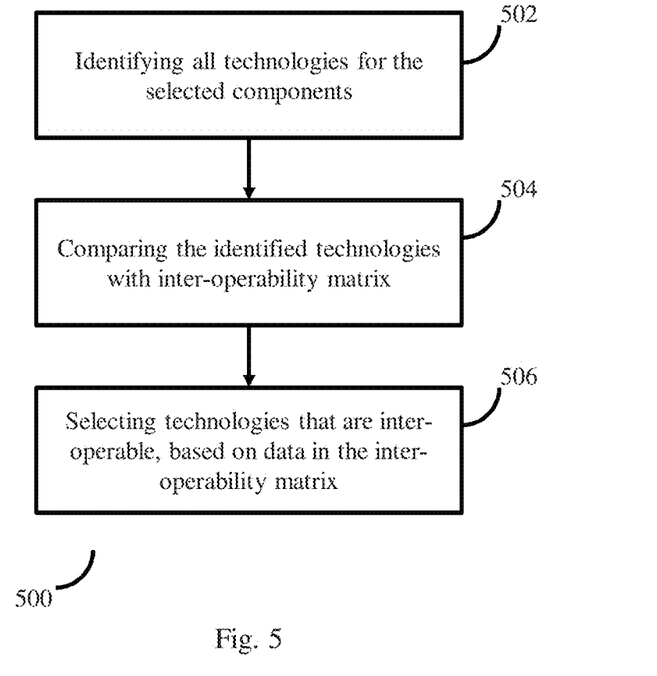
FIG. 5 is a flow diagram depicting steps involved in the process of selecting technologies based on inter-operability of technologies, according to some embodiments of the present disclosure.

FIG. 5 is a flow diagram depicting steps involved in the process of selecting technologies based on inter-operability of technologies, according to some embodiments of the present disclosure. After identifying a plurality of components, based on one or more selected reference architectures, the architecture recommendation system 100 identifies (502) all technologies that match the selected components. However, not all technologies are compatible to each other. So in order to identify technologies that are compatible to each other (as they together constitute an architecture stack), the architecture recommendation system 100 compares (504) the identified technologies with an interoperability matrix that indicates technologies which are inter-operable. Further, based on the comparison, the architecture recommendation system 100 selects (506) technologies that are inter-operable, for the purpose of generating architecture recommendations.

Example Implementation:

It is to be noted that data and data processing schema specified and used at various stages of this example implementation do not intend to limit scope of the invention in any manner. This is only for illustration purpose, and the type of data and amount of data can vary according to different implementation standards and requirements.

Step 1: Collecting inputs (Assume the following input):

```
<?xml version="1.0"?>
<class>
    <template name="exampleApplication">
        <messaging>yes</messaging>
        <streaming>no</streaming>
```

```
        <datastore>no</datastore>
        <dataprocessing>yes</dataprocessing>
        <visualization>no</visualization>
    </template>
    <layer name="messaging">
        <persistence>yes</persistence>
        <semantics>atleastonce</semantics>
    </layer>
    <layer name="dataprocessing">
        <faulttolerance>yes</faulttolerance>
    </layer>
</class>
```

The exampleApplication architecture, consists of two layers—(1) messaging layer (2) data processing layer.

Messaging layer has two features defined: persistence=yes and semantics=at least once. The Data Processing layer has one feature defined: faulttolerance=yes Step 2: Now assume that the priority database maintained in the memory module 103 has the following contents:

```
......
messaging-protocol-amqp=2
messaging-protocol-mqtt=2
messaging-protocol-rest=2
messaging-protocol-stomp=2
messaging-protocol-kafka=1
streaming-model-stream=1
streaming-model-batch=1
streaming-appstate-exactlyonce=2
streaming-appstate-atleastonce=1
streaming-faulttolerance-yes=1
streaming-faulttolerance-no=1
streaming-throughput-greaterthan1m=2
streaming-throughput-lessthan1m=1
streaming-latency-lessthan10ms=2
streaming-latency-greaterthan10ms=1
streaming-state-stateful=1
streaming-state-NotStateful=1
streaming-processing-window=1
streaming-processing-stream=1
streaming-semantics-exactlyonce=3
streaming-semantics-atmostonce=2
streaming-semantics-atleastonce=2
streaming-semantics-besteffort=1
datastore-model-relational=1
datastore-model-content=1
datastore-model-document=1
datastore-model-graph=1
datastore-model-eventstore=1
datastore-model-keyvalue=1
datastore-model-nativeXML=1
datastore-model-objectoriented=1
datastore-model-rdf=1
datastore-model-searchengine=1......
```

Here, the numbers reflect the weights assigned to particular features of different layers. Based on data in the database, appropriate weights are assigned to edges of a graph generated based on the input data.

Step 3: After assigning the appropriate weightages, the recommendation engine 102 identifies, by comparing the inputs with a database of reference architectures (stored in the form of directed acyclic graphs), a reference architecture that matches the inputs. The recommendation engine 102 further determines the weight from the priority-table and calculates a similarity metric.

For the input specified in this example, following is the similarity metric values determined for the relevant parameters:

```
Dataprocessing:faulttolerance -- yes :: 1.0
Dataprocessing:faulttolerance -- no :: 0.5
Messaging:semantics -- exactlyonce :: 0.75
Messaging:semantics -- atmostonce :: 0.5
Messaging:semantics -- atleastonce :: 0.5
Messaging:semantics -- besteffort :: 0.25
Messaging:persistence -- yes :: 0.5
Messaging:persistence -- no :: 1.0
```

A higher similarity metric implies that there is greater similarity with the input. The recommendation engine 102, based on the reference architecture that has been identified as closely matching the inputs, selects components that match the input. Initially the recommendation engine 102 selects user-ask (regardless of the similarity metric). For example, the recommendation engine 102 will select messaging:Semantics:Atleastonce=0.5, rather than semantics:exactlyonce=0.75 because the user-ask is for atleastonce. However in subsequent recommendations, the recommendation engine 102 will select semantics=exactlyonce since it has a higher weight. The recommendation engine 102 then selects technologies for each of the components. A few examples are provided below:

```
Selecting > faulttolerance -- yes -->
[ApacheSpark, ApacheHadoop, ApacheStorm, BlinkDB, ApacheDrill,
Hive]
Data Processing ==>
[ApacheSpark, ApacheHadoop, ApacheStorm, BlinkDB, ApacheDrill,
Hive]
Selecting > semantics -- atleastonce -->
[HornetQ, Kafka, QPiD, ActiveMQ, ZeroMQ, RabbitMQ]
Selecting > persistence -- yes -->
[HornetQ, Kafka, Apollo, QPiD, ActiveMQ, ZeroMQ, RabbitMQ]
Messaging ==> [HornetQ, Kafka, QPiD, ActiveMQ, ZeroMQ,
RabbitMQ]
```

The final set of technologies is an intersection of the technologies selected by the matching the feature set.

Step 4: After selecting/identifying the technologies, in the next step, the recommendation engine 102 determines whether the selected technologies are compatible or not, and output of the compatibility check is indicated using an inter-operability matrix, as given below:

TABLE 2

| Rank | Weight | Recommendation | Compatibility |
| --- | --- | --- | --- |
| 1 | 2.0 | [ApacheSpark, Kafka] | Y |
| 2 | 2.0 | [BlinkDB, ZeroMQ] | Y |
| 3 | 2.0 | [Hive, Kafka] | Y |
| 4 | 2.0 | [Hive, ZeroMQ] | Y |
| 5 | 2.0 | [Hive, RabbitMQ] | Y |
| 6 | 2.75 | [BlinkDB, ZeroMQ] | Y |

In the inter-operability matrix, weights reflect the summation of the weights of the similarity metric. The inter-operability matrix is represented in the recommendation engine 102 as a matrix of 0's & 1's, with the technologies representing the rows and columns of the matrix. As indicated, recommendation in row 6 has a higher weight than the top 5 recommendations. This is because row 6 has selected 'semantics-exactly-once' which has a higher priority value than 'semantics-atleastonce'. But since 'atleastonce' is a user-ask, the top recommendations, will ensure that the user is given exactly what is asked for. In addition to this, the recommendation engine 102 may recommend other choices which might not be an exact feature match, but may have higher weight.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

We claim:

1. A processor-implemented method, comprising:
    collecting at least one user input with respect to an architecture requirement, via one or more hardware processors;
    processing the collected at least one user input, via the one or more hardware processors, comprising:
        generating an acyclic dependency graph based on a plurality of parameters and corresponding values extracted from the user input;
        determining and assigning weightage to each of said plurality of parameters;
        identifying at least one reference architecture that matches the architecture requirement specified in the user input, comprises of:
            generating a similarity index corresponding to the user input, wherein the similarity index indicates extent of similarity between the architecture requirement and each of a plurality of reference architectures in a reference database at component level; and
            selecting a reference architecture for which the similarity index is maximum, as the reference architecture that matches the architecture requirement specified in the user input;
        selecting a plurality of components to serve the architecture requirement, based on the identified at least one reference architecture;
    selecting a plurality of technologies for the plurality of components, based on inter-operability of the technologies, comprises of:
        identifying all technologies for the plurality of components, that match the architecture requirement;
        comparing the identified technologies with an inter-operability matrix stored in an associated database, wherein the inter-operability matrix specifies inter-operability between different technologies, wherein interoperability can be of multiple ways like Boolean interoperability which states if the two technologies are interoperable then they can be recommended together as a part of a single architecture stack and Feature interoperability where the user is interested in determining the interoperability of one or more features of two technologies, wherein a feature level compatibility test is done and based on the number of features that match, wherein an interoperability ratio is determined by using the formula:

$$\text{Interoperability ratio}(Cr) = \frac{\sum_{i=1}^{k} C(t_i f_i, t_j f_l)}{k} \text{ where } t_i, t_j \in T, \quad (4)$$

wherein T={t1, t2, t3, . . . tn} is the set of technologies, n=total number of technologies, F={f1, f2, f3, . . . fk} is a feature set, k=total number of features, C(ti, tj)=Compatibility of 2 technologies ti and tj; and
        selecting a plurality of technologies from the identified technologies for the plurality of components, that are inter-operable according to data in the inter-operability matrix;
        and
        generating at least one architecture recommendation, based on the selected components and technologies; and
    providing the generated at least one architecture as a recommendation, in response to the architecture requirement specified in the user input.

2. The method as claimed in claim 1, wherein the weightage of each of said plurality of parameters is determined by:
    comparing said plurality of parameters with a priority database, wherein the priority database comprises of priorities assigned to different parameters;
    identifying priority of each of said plurality of parameters; and
    determining weightage of each of said plurality of parameters, based on the priority of each of said plurality of parameters.

3. The method as claimed in claim 1, wherein selecting said plurality of components comprises of:
    obtaining similarity index of each of said plurality of components, wherein the similarity index of the components indicate extent of similarity of the components with the user input; and identifying and selecting components with highest similarity index.

4. An architecture recommendation system, comprising:
    a processing module comprising a plurality of hardware processors; and a storage medium comprising a plurality of instructions, said plurality of instructions causing at least one of the plurality of hardware processors to:

collect at least one user input with respect to an architecture requirement, by using an Input/Output (I/O) interface of the architecture recommendation system;

process the collected at least one user input, by using a recommendation engine of the architecture recommendation system, by:

generating an acyclic dependency graph based on a plurality of parameters and corresponding values extracted from the user input;

determining and assigning weightage to each of said plurality of parameters;

identifying at least one reference architecture that matches the architecture requirement specified in the user input, by:

generating a similarity index corresponding to the user input, wherein the similarity index indicates extent of similarity between the architecture requirement and each of a plurality of reference architectures in a reference database at component level; and selecting a reference architecture for which the similarity index is maximum, as the reference architecture that matches the architecture requirement specified in the user input;

selecting a plurality of components to serve the architecture requirement, based on the identified at least one reference architecture;

selecting a plurality of technologies for the plurality of components, based on inter-operability of the technologies, by:

identifying all technologies for the plurality of components, that match the architecture requirement;

comparing the identified technologies with an inter-operability matrix stored in an associated database, wherein the inter-operability matrix specifies inter-operability between different technologies, wherein interoperability can be of multiple ways like Boolean interoperability which states if the two technologies are interoperable then they can be recommended together as a part of a single architecture stack and Feature interoperability where the user is interested in determining the interoperability of one or more features of two technologies, wherein a feature level compatibility test is done and based on the number of features that match, wherein an interoperability ratio is determined by using the formula:

$$\text{Interoperability ratio}(Cr) = \frac{\sum_{i=1}^{k} C(t_i, f_i, t_j, f_i)}{k} \text{ where } t_i, t_j \in T, \quad (4)$$

wherein T={t1, t2, t3, . . tn} is the set of technologies, n=total number of technologies, F={f1, f2, f3, . . . fk} is a feature set, k=total number of features, C(ti, tj)=Compatibility of 2 technologies ti and tj; and selecting a plurality of technologies from the identified technologies for the plurality of components, that are inter-operable according to data in the inter-operability matrix; and generating at least one architecture recommendation, based on the selected components and technologies; and providing the generated at least one architecture as a recommendation, by using the I/O interface, in response to the architecture requirement specified in the user input.

5. The architecture recommendation system as claimed in claim 4, wherein the recommendation engine is configured to determine the weightage of each of said plurality of parameters by:

comparing said plurality of parameters with a priority database, wherein the priority database comprises of priorities assigned to different parameters;

identifying priority of each of said plurality of parameters; and determining weightage of each of said plurality of parameters, based on the priority of each of said plurality of parameters.

6. The architecture recommendation system as claimed in claim 4, wherein the recommendation engine is configured to select said plurality of components by:

obtaining similarity index of each of said plurality of components, wherein the similarity index of the components indicate extent of similarity of the components with the user input; and identifying and selecting components with highest similarity index.

7. One or more non-transitory machine readable information storage mediums comprising one or more instructions which when executed by one or more hardware processors cause:

collecting at least one user input with respect to an architecture requirement, via one or more hardware processors;

processing the collected at least one user input, via the one or more hardware processors, comprising:

generating an acyclic dependency graph based on a plurality of parameters and corresponding values extracted from the user input;

determining and assigning weightage to each of said plurality of parameters;

identifying at least one reference architecture that matches the architecture requirement specified in the user input, comprises of:

generating a similarity index corresponding to the user input, wherein the similarity index indicates extent of similarity between the architecture requirement and each of a plurality of reference architectures in a reference database at component level; and selecting a reference architecture for which the similarity index is maximum, as the reference architecture that matches the architecture requirement specified in the user input;

selecting a plurality of components to serve the architecture requirement, based on the identified at least one reference architecture;

selecting a plurality of technologies for the plurality of components, based on inter- operability of the technologies, comprises of:

identifying all technologies for the plurality of components, that match the architecture requirement;

comparing the identified technologies with an inter-operability matrix stored in an associated database, wherein the inter-operability matrix specifies inter-operability between different technologies, wherein interoperability can be of multiple ways like Boolean interoperability which states if the two technologies are interoperable then they can be recommended together as a part of a single architecture stack and Feature interoperability where the user is interested in determining the interoperability of one or more features of two technologies, wherein a feature level compatibility test is done and based on the number of features that match, wherein an interoperability ratio is determined by using the formula:

$$\text{Interoperability ratio}(Cr) = \frac{\sum_{i=1}^{k} C(t_i f_i, t_j f_i)}{k} \text{ where } t_i, t_j \in T, \quad (4)$$

wherein T={t1, t2, t3, . . . tn} is the set of technologies, n=total number of technologies, F={f1, f2, f3, . . . fk} is a feature set, k=total number of features, C(ti, tj)=Compatibility of 2 technologies ti and tj; and selecting a plurality of technologies from the identified technologies for the plurality of components, that are inter-operable according to data in the inter-operability matrix; and generating at least one architecture recommendation, based on the selected components and technologies; and providing the generated at least one architecture as a recommendation, in response to the architecture requirement specified in the user input.

8. The one or more non-transitory machine readable information storage mediums as claimed in claim 7, wherein the weightage of each of said plurality of parameters is determined by:

comparing said plurality of parameters with a priority database, wherein the priority database comprises of priorities assigned to different parameters;

identifying priority of each of said plurality of parameters; and determining weightage of each of said plurality of parameters, based on the priority of each of said plurality of parameters.

9. The one or more non-transitory machine readable information storage mediums as claimed in claim 7, wherein selecting said plurality of components comprises of:

obtaining similarity index of each of said plurality of components, wherein the similarity index of the components indicate extent of similarity of the components with the user input; and identifying and selecting components with highest similarity index.

* * * * *